United States Patent [19]
Cook

[11] 3,876,828
[45] Apr. 8, 1975

[54] SYNC SEPARATOR

[75] Inventor: Ralph H. Cook, Chicago, Ill.

[73] Assignee: Admiral Corporation, Chicago, Ill.

[22] Filed: Jan. 8, 1973

[21] Appl. No.: 321,786

[52] U.S. Cl. .......... 178/7.3 S; 178/DIG. 12
[51] Int. Cl. .......... H04n 5/08
[58] Field of Search .......... 178/7.3 S, 7.5 S, DIG. 12, 178/69.5 TV, 69.5 R, 7.5 DC; 328/170, 173; 331/20

[56] References Cited

UNITED STATES PATENTS

| | | | |
|---|---|---|---|
| 2,223,982 | 12/1940 | Bedford | 178/7.3 |
| 2,230,243 | 2/1941 | Haffcke | 178/DIG. 12 |
| 2,675,424 | 4/1954 | Germany | 178/7.3 |
| 2,864,888 | 12/1958 | Goodrich | 178/7.3 S |
| 2,864,888 | 12/1958 | Goodrich | 178/7.3 |

*Primary Examiner*—Robert L. Griffin
*Assistant Examiner*—John Godfrey
*Attorney, Agent, or Firm*—Hill, Gross, Simpson, Van Santen, Steadman, Chiara & Simpson

[57] ABSTRACT

A noninverting, hum tolerant sync separator having a video signal coupled to an emitter of a transistor and an RC time constant in the base circuit. The separated sync pulse is taken from the collector and coupled to the television deflection system.

3 Claims, 4 Drawing Figures

SYNC SEPARATOR

BACKGROUND OF THE INVENTION

1. Description of the Prior Art

Existing sync separators accept the composite video signal at the transistor base and utilize a stable reference for the emitter. This reference may be a positive or a negative voltage or circuit ground. The video signal applied to the transistor base provides signal biasing such that only the sync tips forward bias the transistor. The resulting sync pulses are taken from the collector of the transistor.

The use of a stable reference for the emitter can result in irregularities in the final sync pulse. When low frequency modulation is present in the video signal, portions of the sync pulse may not reach the conducting region of the base to emitter voltage, and the result is missing sync pulses at the output of the separator. This, in turn, causes a twisted picture.

2. Field of the Invention

The field to which this invention pertains is sync separator circuits for television receivers and, in particular, to sync separator circuits using transistor devices as the means for separating the sync pulse from the video signal.

SUMMARY OF THE INVENTION

It is an object of the present invention to provide an improved sync separator circuit.

It is a further object of the present invention to provide a transistor sync separator circuit which faithfully separates each sync pulse from the video signal.

It is another object of the present invention to provide a sync separator circuit utilizing a transistor having a video signal coupled to the emitter to eliminate undesirable effects of hum modulation.

It is also an object of the present invention to provide a transistor arrangement for a sync separator in a television receiver wherein the video signal is coupled to the emitter and a time constant is provided in the base with the separated sync signal being taken from the collector.

It is an additional object of the present invention to provide a sync separator circuit as described above wherein the time constant in the base of the separator transistor is of such a value as to maintain a constant base to emitter voltage at normal hum modulation frequencies.

These and other objects of the present invention will be understood in greater detail from the following drawings and the associated description wherein reference numerals are utilized to designate a preferred embodiment.

BRIEF DESCRIPTION OF THE DRAWINGS

In FIG. 1 there is no hum modulation and all the sync tips are present.

DESCRIPTION OF THE PREFERRED EMBODIMENT

The present invention relates to a sync separator circuit for developing uniform sync pulses despite the presence of hum modulation.

Prior sync separator circuits have been developed using transistor separators wherein the composite video signal is applied to the base of the transistor and the separated sync signal is taken from the collector. A stable reference is used for the emitter. This reference may be either positive negative or ground potential. The transistor is usually signal biased in such a way that only the sync tips are allowed to cause the transistor to be forward biased.

However, it has been found that transistor circuits for sync separation as described above have the drawback of being responsive to hum modulation of the video signal. In such circuits, the result may be that the sync tips cannot reach the conducting region of the base to emitter voltage, and consequently some sync pulses will be missing at the output of the separator. The consequence is that the resulting television picture appears twisted, or vertical lines become "S" shaped.

Figures 1, 2:
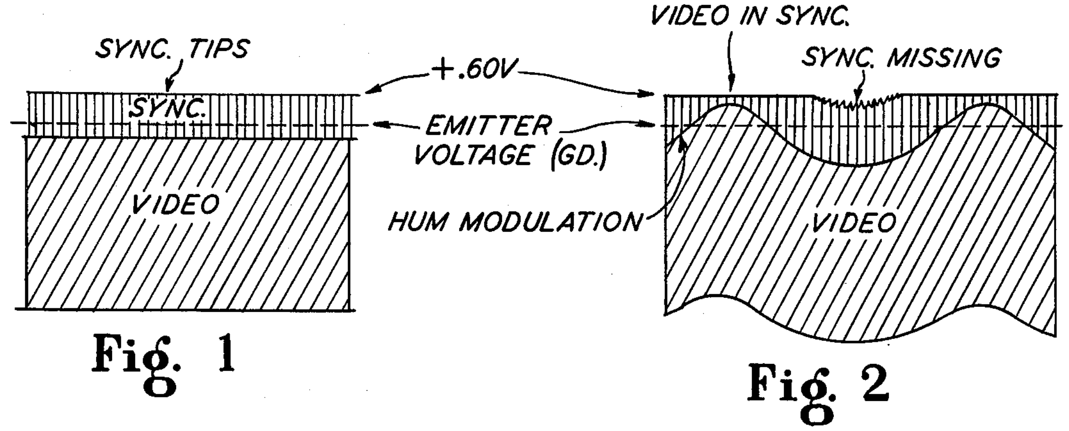
FIG. 1 shows a section of video signal with a plurality of sync tips superimposed thereon.
FIG. 2 shows a video signal similar to that shown in FIG. 1 with hum modulation present. In this example, video is found present in some portions of the sync tips, and in other portions, the sync tips are actually missing.

To show the result of hum modulation on the composite video signal of a type prior art sync separator, reference is made to FIGS. 1 and 2. In each case, the transistor is receiving a video signal with positive going sync, with the emitter at ground potential. FIG. 1 shows the video signal with no hum on its input. In contrast, FIG. 2 shows the base to ground waveform with hum modulating the input signal.

In the FIG. 1 situation, the sync tips are undisturbed since there is no hum modulation, however, in FIG. 2, this is not the case.

In FIG. 2, the grounding of the emitter has resulted in the video portion of the composite signal reaching the conducting region of the transistor at one point in the hum cycle and allowing the video to appear in the separated sync. At another point in the hum cycle, the sync tips cannot reach the conducting region of the base to emitter voltage, and the result is missing sync pulses at the output of the separator.

The base to emitter voltage of a transistor determines the collector current. When the emitter is fixed in potential, while the base voltage varies with the hum voltage, the resultant collector current may have video present, or may be void of any output during some portion of the hum cycle. The circuit of FIG. 3 operates in a different manner and eliminates the problem of hum modulation.

Figure 3:
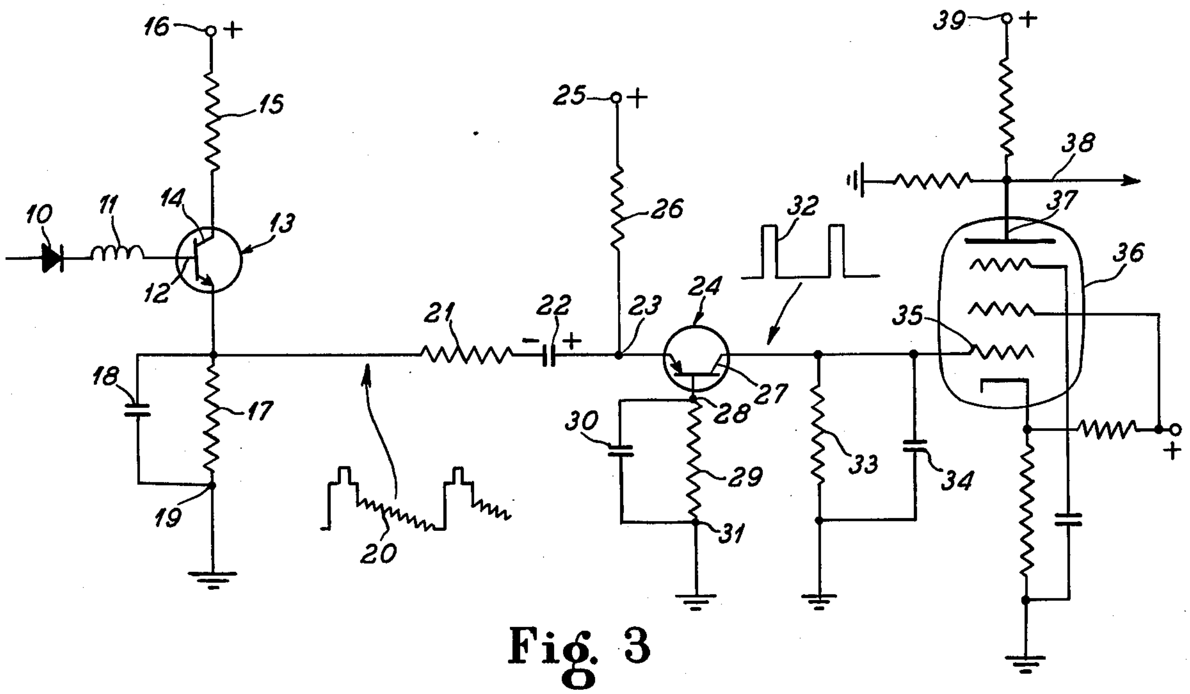
FIG. 3 shows a hum tolerant sync separator according to the present invention utilizing a transistor circuit arrangement having a video signal coupled to the emitter and a time constant control in the base circuit thereof.

In FIG. 3, a video detector 10 detects a video signal and couples the signal through a coil 11 to a base 12 of a transistor 13.

The transistor 13 has a collector 14 coupled through a resistor 15 to a 25 volt supply at a point 16.

The emitter of the transistor 13 is coupled to a parallel combination of a resistor 17 and a capacitor 18. The opposite side of the elements 17 and 18 are coupled to circuit ground at a point 19.

The output of the transistor 13 is a composite video signal as shown at 20. The signal is coupled through a series combination of a resistor 21 and a capacitor 22 to an emitter terminal 23 of a sync separator transistor 24. A 25 volt positive reference potential is coupled from a circuit point 25 through a resistor 26 to the emitter 23 of the transistor 24. Capacitor 22 and resistor 26 act to reference the emitter signal more positive to obtain more sync amplitude at the collector 27 such that the sync tips drive the following pentode into saturation.

The base 28 of the transistor 24 is coupled through a time constant circuit which includes a resistor 29 and a capacitor 30; these elements being coupled to circuit ground at the point 31. The time constant of the elements 29 and 30 is chosen so as to cause the base voltage of the transistor 24 to follow the emitter voltage at the hum modulation frequencies and to eliminate thereby any effect of the hum on the resulting separated sync signals.

The resulting separated sync signal is shown at 32 and appears at the collector 27 of the transistor 24.

The collector 27 is coupled to a further combination of resistor and capacitor, namely, a resistor 33 and a capacitor 34. Resistor 33 is the collector load resistor, and capacitor 34 is the noise pass band limit capacitor.

The collector of the transistor 24 is also coupled directly to a control grid 35 of a pentode 36. The pentode has an output at a plate 37 which is coupled through a circuit line 38 to the vertical and horizontal deflection circuits. The plate of the pentode 36 is biased by a 300 volt positive supply at a circuit point 39.

Since in the arrangement shown in FIG. 3 the video input signal is fed to the emitter of the transistor, the base is available for a circuit designer to choose an RC time constant which is consistent with his objectives. This is not true with previous sync separators which have the signal input to the base, since any time constant placed in the emitter has not only the signal base current charging the time constant, but also the output collector current flowing into the emitter time constant. For this reason, the emitter of the base fed sync separator is coupled to a stable reference such as circuit ground, while the RC time constant and the input video signal are both coupled to the base circuit.

In FIG. 3, the base time constant is chosen large enough to faithfully separate the vertical sync interval, yet is selected to be sufficiently small to permit the base voltage to follow the hum frequency on the input video signal.

Figure 4:
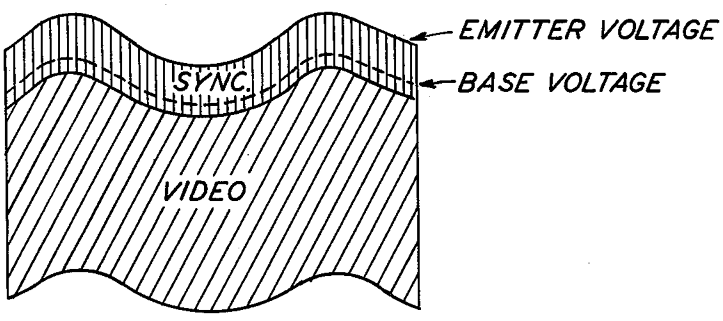
FIG. 4 shows a video signal and a plurality of sync tips superimposed thereon similar to FIGS. 1 and 2 and illustrating that in the operation of the circuit of FIG. 3, even the presence of hum modulation does not effect the final sync pulses.

Therefore, as shown in FIG. 4, while the emitter video signal is changing in amplitude due to the hum modulation, the base signal although free to video or sync, is also changing in amplitude with the hum. The resultant change in voltage between the base and emitter due to hum is nil and hence the separator is allowed to function in the presence of hum.

In FIG. 4 a hum modulated video signal at the emitter of the separator is shown, and also the base voltage of the transistor is shown as following the hum level on the emitter. This then results in a relatively constant base to emitter voltage. Consequently, in the arrangement of FIG. 3, a constant dependable train of sync pulses are derived from the separator.

What I claim is:

1. In a television receiver having means for developing a video signal having a hum modulation frequency and a positive going sync pulse and a deflection circuit utilizing said sync pulse to synchronize deflection of the beam of a cathode ray tube, a sync separator circuit comprising: a transistor having the video signal applied to its emitter and having a time constant circuit coupled to the base to assure that the base to emitter voltage is substantially constant at hum modulation frequencies of the video signal, said time constant being large enough to faithfully separate the sync interval and also being chosen to be small enough to permit the base voltage to follow the hum frequency on the input video signal, and means for deriving the separated sync pulses at the collector of said transistor and for coupling the same to said television deflection circuit.

2. A sync separator in accordance with claim 1, wherein said base of said transistor is referenced to circuit ground through said time constant circuit.

3. A sync separator in accordance with claim 2, wherein said time constant circuit comprises a parallel combination of a resistor and a capacitor.

* * * * *